United States Patent
Speranza et al.

(10) Patent No.: US 7,550,113 B2
(45) Date of Patent: Jun. 23, 2009

(54) SYSTEM FOR MAINTAINING HYDROGEN PURITY IN ELECTRICAL GENERATORS AND METHOD THEREOF

(75) Inventors: A. John Speranza, West Hartford, CT (US); Luisa Gudino, Downingtown, PA (US)

(73) Assignee: Proton Energy Systems, Inc., Wallingford, CT (US)

( * ) Notice: Subject to any disclaimer, the term of this patent is extended or adjusted under 35 U.S.C. 154(b) by 193 days.

(21) Appl. No.: 10/711,395

(22) Filed: Sep. 16, 2004

(65) Prior Publication Data

US 2006/0057034 A1  Mar. 16, 2006

(51) Int. Cl.
C25B 9/00 (2006.01)
H01M 8/18 (2006.01)
G01N 35/08 (2006.01)
H02K 9/00 (2006.01)
C25B 15/00 (2006.01)
C25B 11/04 (2006.01)
G01N 21/00 (2006.01)

(52) U.S. Cl. .................. 422/62; 204/252; 204/256; 204/258; 204/266; 204/228.6; 205/637; 310/55; 429/19; 436/55

(58) Field of Classification Search .............. 436/55; 204/252, 256, 258, 266, 228.6; 205/637; 310/55; 429/19; 422/62
See application file for complete search history.

(56) References Cited

U.S. PATENT DOCUMENTS

| | | | |
|---|---|---|---|
| 4,891,629 A * | 1/1990 | Gajjar et al. ............. 340/632 |
| 5,510,201 A * | 4/1996 | Werth ........................ 429/17 |
| 5,929,324 A | 7/1999 | Hu et al. ...................... 73/40 |
| 6,305,442 B1 * | 10/2001 | Ovshinsky et al. .......... 141/231 |
| 6,524,464 B2 | 2/2003 | Dubey, Jr. .................. 205/335 |
| 6,841,046 B2 | 1/2005 | Pathawala ................ 204/229.8 |
| 2003/0009164 A1 | 1/2003 | Woloszko et al. ............. 606/41 |
| 2003/0090164 A1 * | 5/2003 | Brosnihan et al. ............. 310/55 |
| 2003/0141200 A1 * | 7/2003 | Harada ....................... 205/637 |

FOREIGN PATENT DOCUMENTS

| EP | 0 229719 B1 | 7/1987 |
|---|---|---|
| JP | 59216441 | 12/1984 |
| JP | 60145408 | 7/1985 |
| JP | 1995231610 A | 8/1995 |

OTHER PUBLICATIONS

Douglas J. Smith, Hydrogen Purity vs. Vindage Loss, Powser Engineering, Penwell Corp. 2002,3 pages.
JD Albright & DR Albright, Generatortech, Inc., Generator Field Winding Shorted Turns: Moisture Effects, Workshop/Aug. 2003, USA,9pages.

* cited by examiner

Primary Examiner—Jill Warden
Assistant Examiner—Lore Ramillano
(74) Attorney, Agent, or Firm—Cantor Colburn LLP

(57) ABSTRACT

A method and apparatus is provided for an a system for maintaining hydrogen purity in an electrical power generator. The purity system includes: a generator, a hydrogen generator configured to provide hydrogen gas to the generator, a purity monitor for detecting the level of hydrogen purity in the generator and providing a signal when the purity drops below a predetermined threshold. The system automatically compensates for gas loss or contamination to maintain the desired level of efficiency in the electrical generator.

11 Claims, 7 Drawing Sheets

SYSTEM FOR MAINTAINING HYDROGEN PURITY IN ELECTRICAL GENERATORS AND METHOD THEREOF

FIELD OF INVENTION

This disclosure relates generally to electrical generator systems and especially to electrical generators utilizing hydrogen gas to cool the generator.

BACKGROUND OF THE INVENTION

Modern electrical power plants often utilize turbine generators to produce electricity. During operation, these generators produce large amounts of heat which must be dissipated in order for the generators to operate at maximum efficiency. Traditionally, air was used as a cooling medium to help dissipate the heat. However, as generator capacity and size increased, hydrogen replaced air due to its high heat capacity and low density. Additionally, the use of hydrogen reduces the windage or friction losses over comparably sized air cooled units.

Due to the loss in efficiency from windage, it is desirable to maintain as high a purity level of the hydrogen in the generator. As shown in FIG. 1, as the windage loss increases due to impurities, the financial loss to the power plant correspondingly increases. For a 800 MW generator, an 8% decrease in the purity of the hydrogen in the generator increases the cost of producing electricity by almost $4000 per day. Accordingly, it is desirable to maintain as high a level of purity as possible.

While the generator is in operation, hydrogen is continuously lost due to leaks in seals. Traditionally, to maintain the appropriate level of pressure and purity in the generator, the power plant operator would purchase hydrogen gas in bulk from gas producers who delivered the gas in cylinders or by tanker truck. The operator would periodically check the purity level and add hydrogen from the hydrogen gas cylinders as needed.

As an alternative to using bulk purchased hydrogen gas, power plant operators have also used electrolysis gas generators which allow the operator to produce hydrogen gas on-site. The electrolysis generators use electricity to split water into hydrogen and oxygen gas. The use of electrolysis typically reduced the cost of using hydrogen and also reduced the security concerns of the power plants in having to receive and store large quantities of a flammable gas. Typically, however, the electrolysis generators which are economically viable for providing makeup gas for the electrical generator lacked the capacity to produce sufficient volumes of hydrogen to quickly purge or fill the electrical generator after it had been shut down for maintenance. Also, plant operators still relied on manual filling of the generators which did not allow for optimal efficiencies.

Accordingly, what is needed in the art is a system for maintaining high purity levels of hydrogen in an electrical power generator and for providing a means for utilizing an on-site hydrogen generator to produce sufficient hydrogen to purge or fill the electrical power generator.

SUMMARY OF THE INVENTION

A method and apparatus is provided for an a system for maintaining hydrogen purity in an electrical power generator. The purity system includes: a generator, a hydrogen generator configured to provide hydrogen gas to the generator, a purity monitor for detecting the level of hydrogen purity in the generator and providing a signal when the purity drops below a predetermined threshold. The system automatically compensates for gas loss or contamination to maintain the desired level of efficiency in the electrical generator.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DESCRIPTION OF PREFERRED EMBODIMENT

As the demand for power by consumers has increased, electrical power producers have increasingly turned to larger generators to fulfill the needs of society. As the size of the generators increased, it became increasingly more difficult to maintain the generator at an appropriate operating temperature to prevent damage to the generator components. Smaller generators relied on air cooling to dissipate heat from the generator rotor windings. To improve heat transfer, generator manufacturers began to utilitize hydrogen gas as a transfer agent since the thermal conductivity of hydrogen is seven times that of air.

Figure 1:
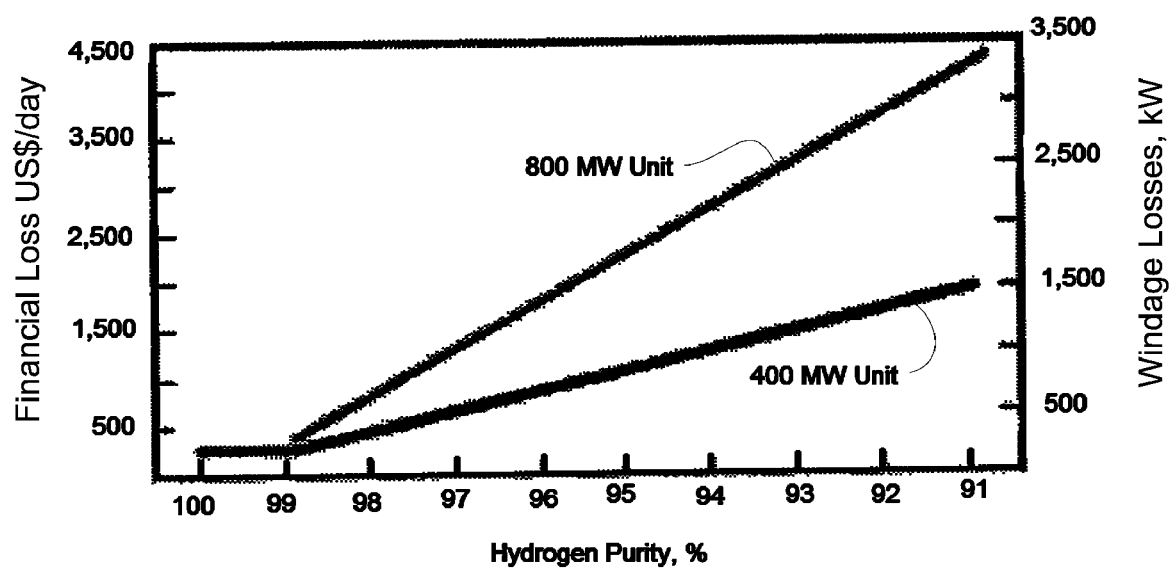
FIG. 1 is a graphical plot illustrating the windage losses as a function of hydrogen purity.

The switch to hydrogen also yielded side benefits by reducing the windage losses in the generator due to hydrogen's lower density. As shown in FIG. 1, the higher purity level of the hydrogen gas in the generator, the lower the windage losses. However, since the generator contains various components, such as seals which must be lubricated, contaminants such as water and oil become mixed with the gas reducing the purity levels. To compensate for these contaminants, operators utilized purifying systems, such as a heated regenerative dryer, which allowed removal of water from the generator without having to purge the generator of a costly gas.

In addition to contamination, operators must cope with hydrogen leaks which typically occur at the generators seals. As hydrogen escapes, the operator must add make-up hydrogen gas to the generator in order to maintain the heat transfer and low windage benefits. In a typical generator such as a GE Frame-7 generator, the loss of hydrogen and the amount of hydrogen can reach up to 20-40 cubic feet of hydrogen per hour.

Figure 2:
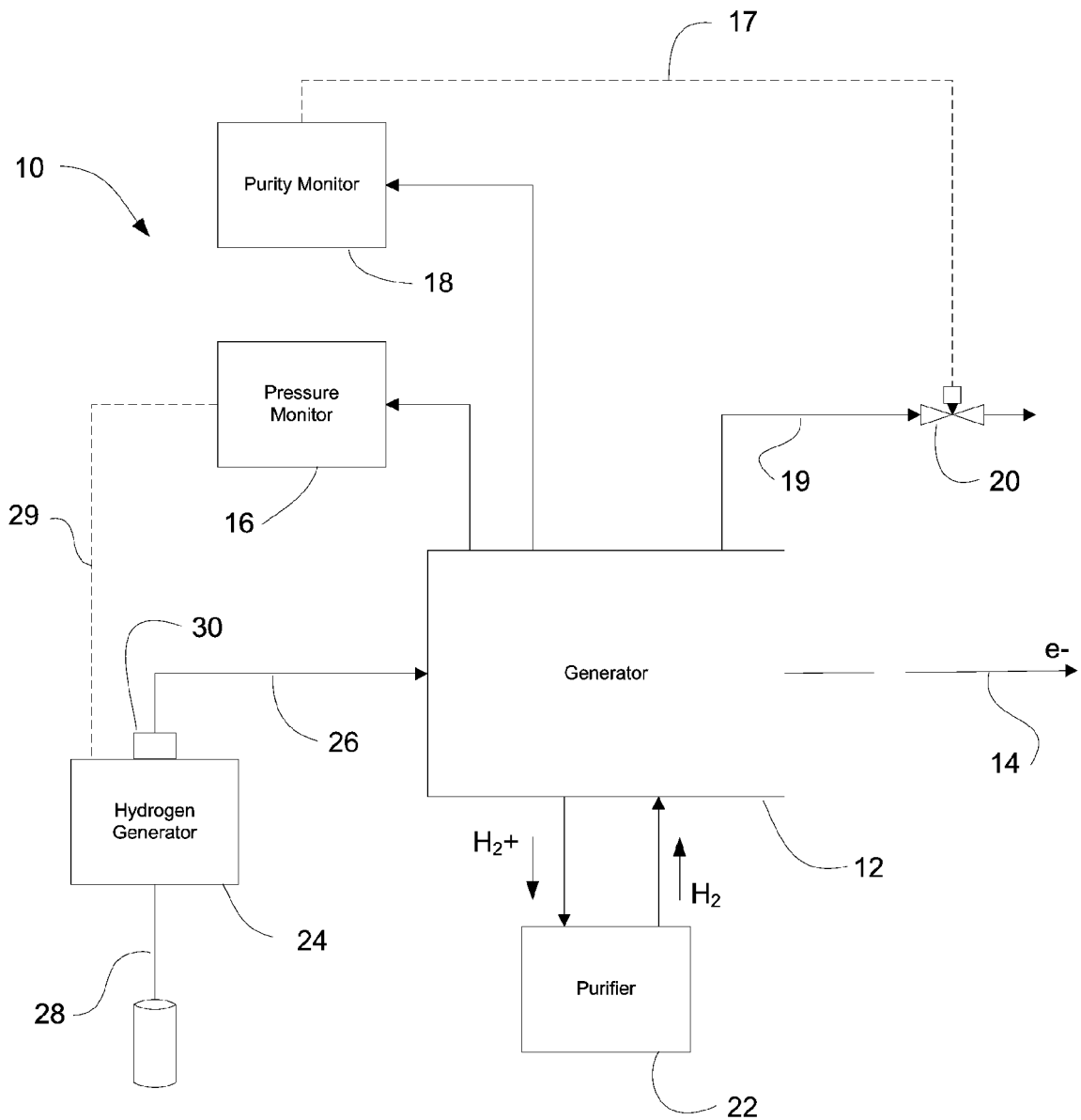
FIG. 2 is a schematic diagram illustrating the hydrogen purity system of the present invention.

An exemplary embodiment of the present invention is shown in FIG. 2. The generator system 10 includes a generator 12 which may be driven by any conventional means, such as a steam turbine (not shown). The generator 12 produces electricity which is transmitted to the utility grid 14. The pressure inside the generator is monitored by a pressure monitor 16 and the purity of the hydrogen gas inside the generator is monitored by a monitor 18. As will be described in more detail herein, the purity monitor may be of any suitable type capable, such as but not limited to a thermal conductivity analyzer or a vibrating element analyzer.

The generator 12 also includes a vent line 19 which connects to a solenoid valve 20. The outlet of the valve 20 leads to a vent which allows the hydrogen gas to be properly dissipated into the atmosphere. As will be described in more detail herein, a communications link 17 connects the purity monitor 18 with the solenoid valve 20. A hydrogen generator 24 provides hydrogen gas to the generator 12 through conduit 26. Alternatively, the a controller (not shown) in the generator 12 controls the solenoid valve 20 to vent the hydrogen gas.

In the preferred embodiment, the hydrogen generator will include a water-fed electrochemical cell which is capable of disassociating reactant water into hydrogen and oxygen gas. Suitable reactant water is deionized, distilled water, which is continuously supplied from a water source 28. The electrochemical cell will preferably be of a polymer electrode membrane (PEM) type. The electrochemical cell may also be any other suitable electrochemical cell such as, but not limited to, alkaline, phosphoric acid, or solid oxide based cells. The hydrogen generator 24 may also be any non-electrochemical system capable of producing hydrogen gas such as, but not limited, a steam methane, or natural gas reformation.

An output sensor 30 is incorporated into the hydrogen generator 24 to sense the differential pressure between the downstream in the conduit 26. The output sensor 30 may be a pressure transducer that converts gas pressure within the conduit 26 to a voltage or current level indicative of the gas pressure. Output sensor may also be any other sensor suitable for sensing a qualitative or quantitative parameter of the gas and provide an electrical signal indicative of that parameter as an output. Such other sensors include, but are not limited to, a flow rate sensor, a mass flow sensor, and a differential pressure sensor. Optionally, a feedback signal 29 may be provided from the pressure monitor 18 to the hydrogen generator 24

Output sensor 30 interfaces with a controller (not shown) that is capable of converting the analog voltage or current level provided by the sensor 30 into a digital signal indicative of the sensed hydrogen pressure. The controller compares the sensed hydrogen pressure to a predetermined parameter for controlling the output of the hydrogen generator 24 as will be described in more detail herein.

Figure 3:
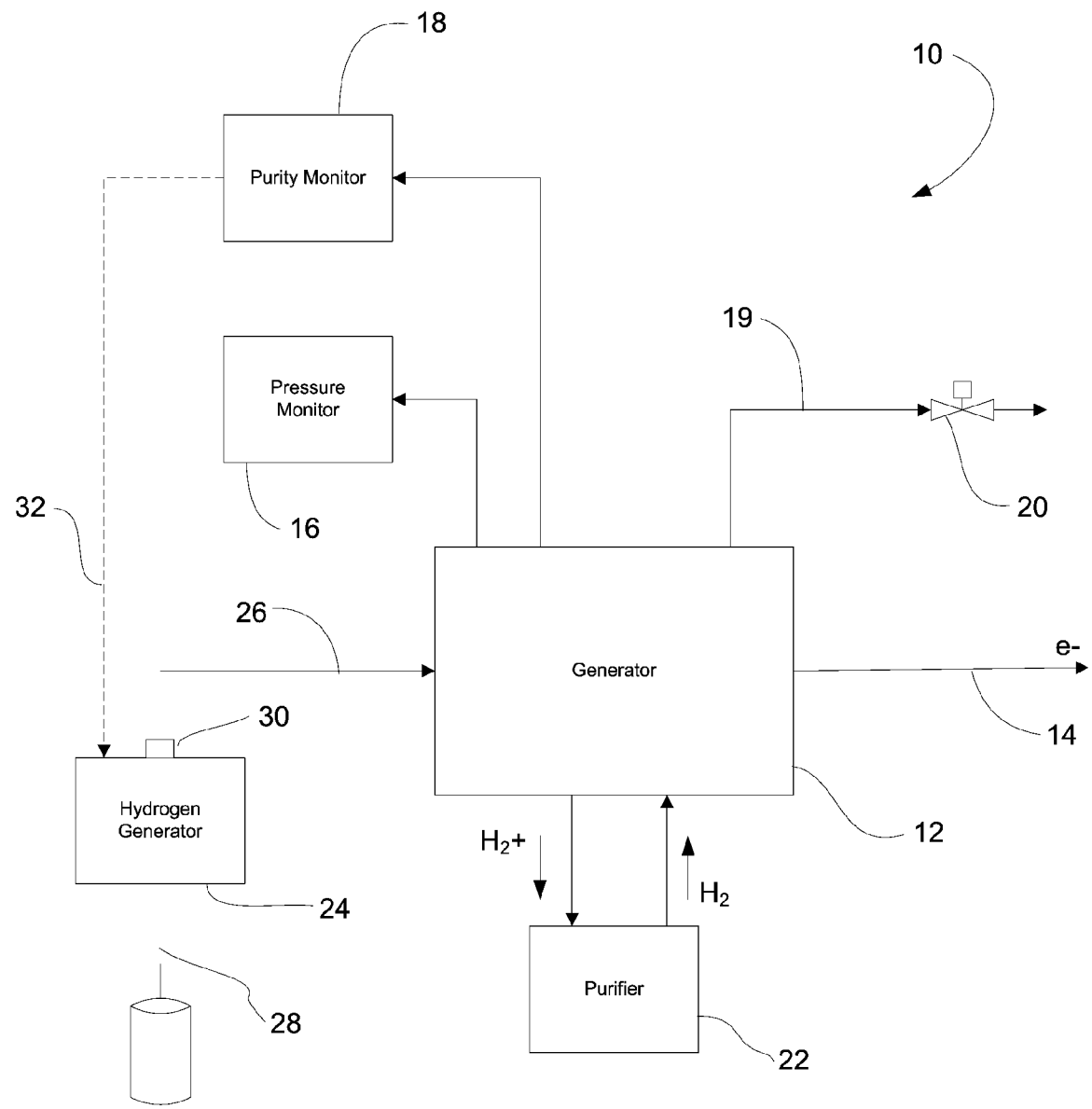
FIG. 3 is a schematic diagram illustrating an alternate embodiment hydrogen purity system of the present invention.

An alternate embodiment of the electrical power generating system 10 is shown in FIG. 3. In this embodiment, the purity monitor 18 is electrically coupled to the electrolyzer 24 by line 32 to provide a control signal when the hydrogen gas purity level drops below a predetermined threshold.

Electrical power generators hold a large volume of hydrogen gas, typically at least 7,500 cubic feet. Consequently, at an event where the generator needs to be purged and filled with hydrogen gas, such as at startup, or after maintenance, the operator will need access to a large volume of hydrogen gas. Events such as startup or maintenance purging typically occur on an annual basis. Since a hydrogen generator capable of generating this volume of hydrogen in a short period of time would be greatly over-sized for daily operation. Accordingly, it is desirable to have a means for storing excess hydrogen gas generated by the hydrogen generator 24. In the embodiment shown in FIG. 4, the hydrogen generator has a first conduit 26 which provides hydrogen to the generator 12 as described herein above. The hydrogen generator 24 further includes a second conduit 34 and a valve 27 which fluidly couples the hydrogen generator to at least one storage tank 40.

The system 10 may also optionally include a solenoid valve 36 and a compressor 38 coupled to the conduit 34. An optional pressure transducer 42 may be electrically coupled to the valve 36 to terminate filling of the tank 40 once a desired pressure level is reached. The compressor may be any suitable type, such as but not limited to a metal hydride compressor, an electrochemical compressor, or a mechanical compressor. The compressor 38 is shown external to the hydrogen generator 24 for exemplary purposes, preferably, the compressor may be integrated with the hydrogen generator 24. A conduit 46 fluidly couples the tank 40 with the generator 12. A valve 48 controls flow from the tank to the generator 12.

Figure 5:
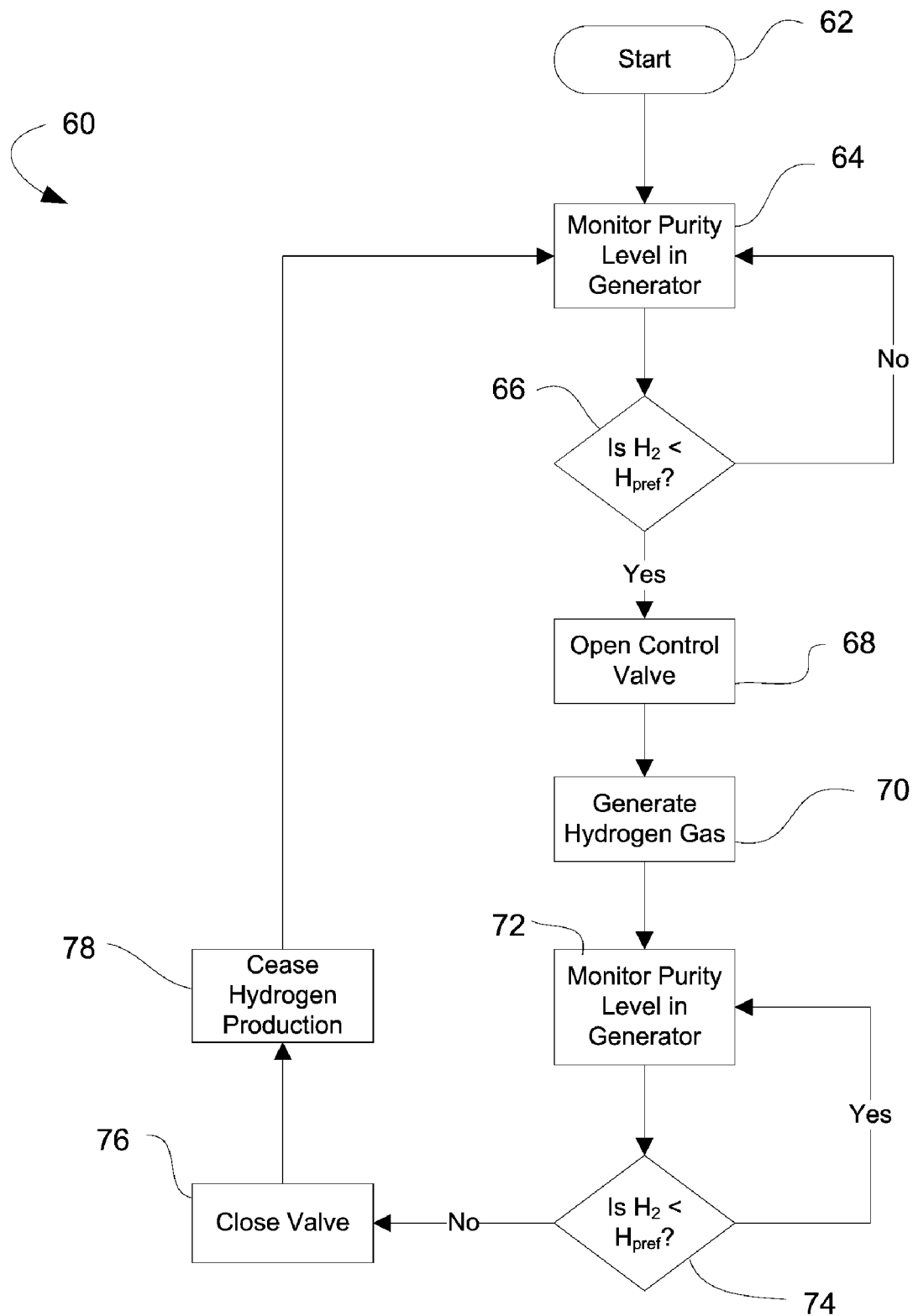
FIG. 5 is a block flow diagram illustrating the method of operating the system of FIG. 2.
Figure 6:
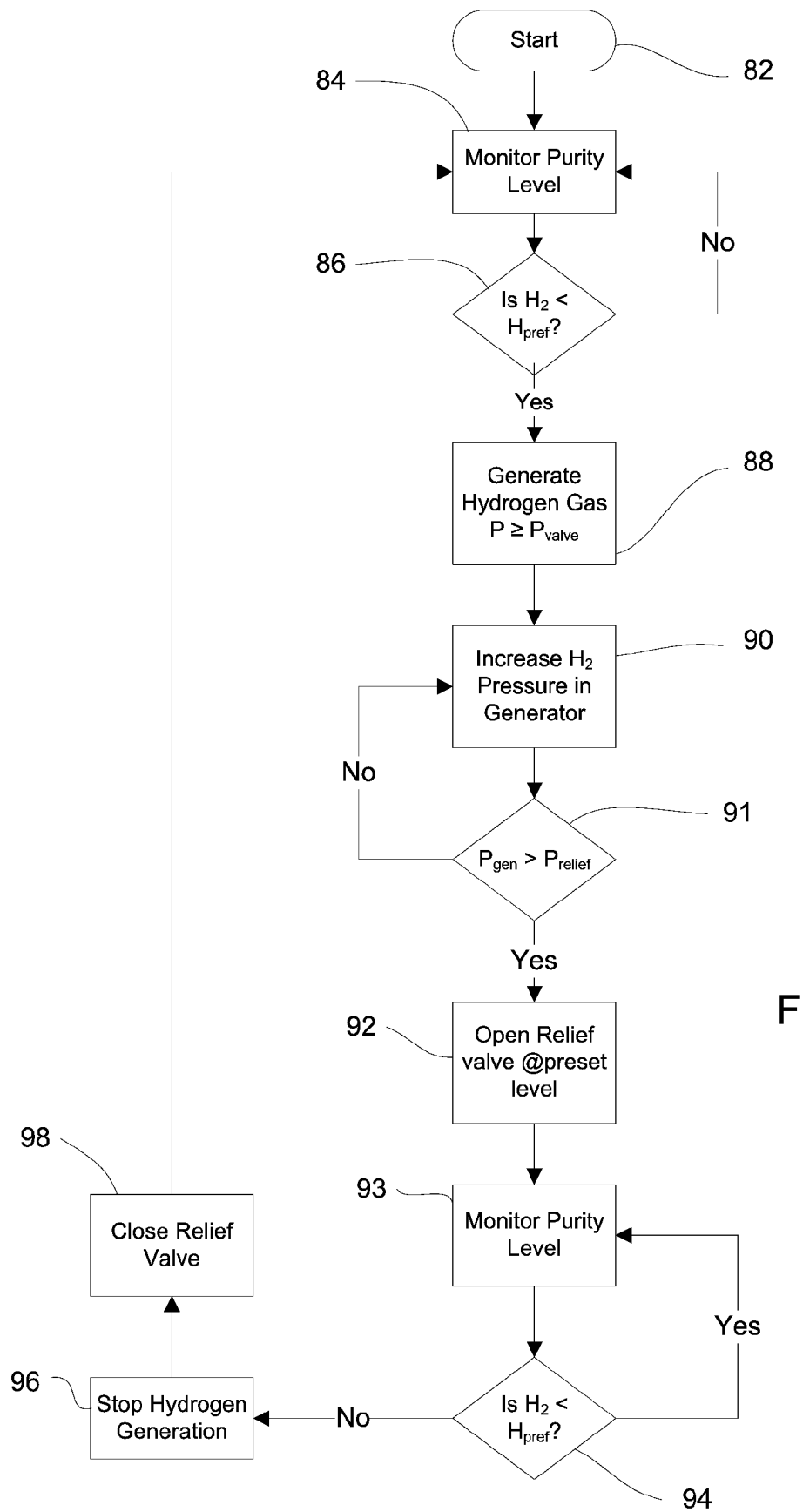
FIG. 6 is a block flow diagram illustrating the method of operating the system of FIG. 3.
Figure 7:
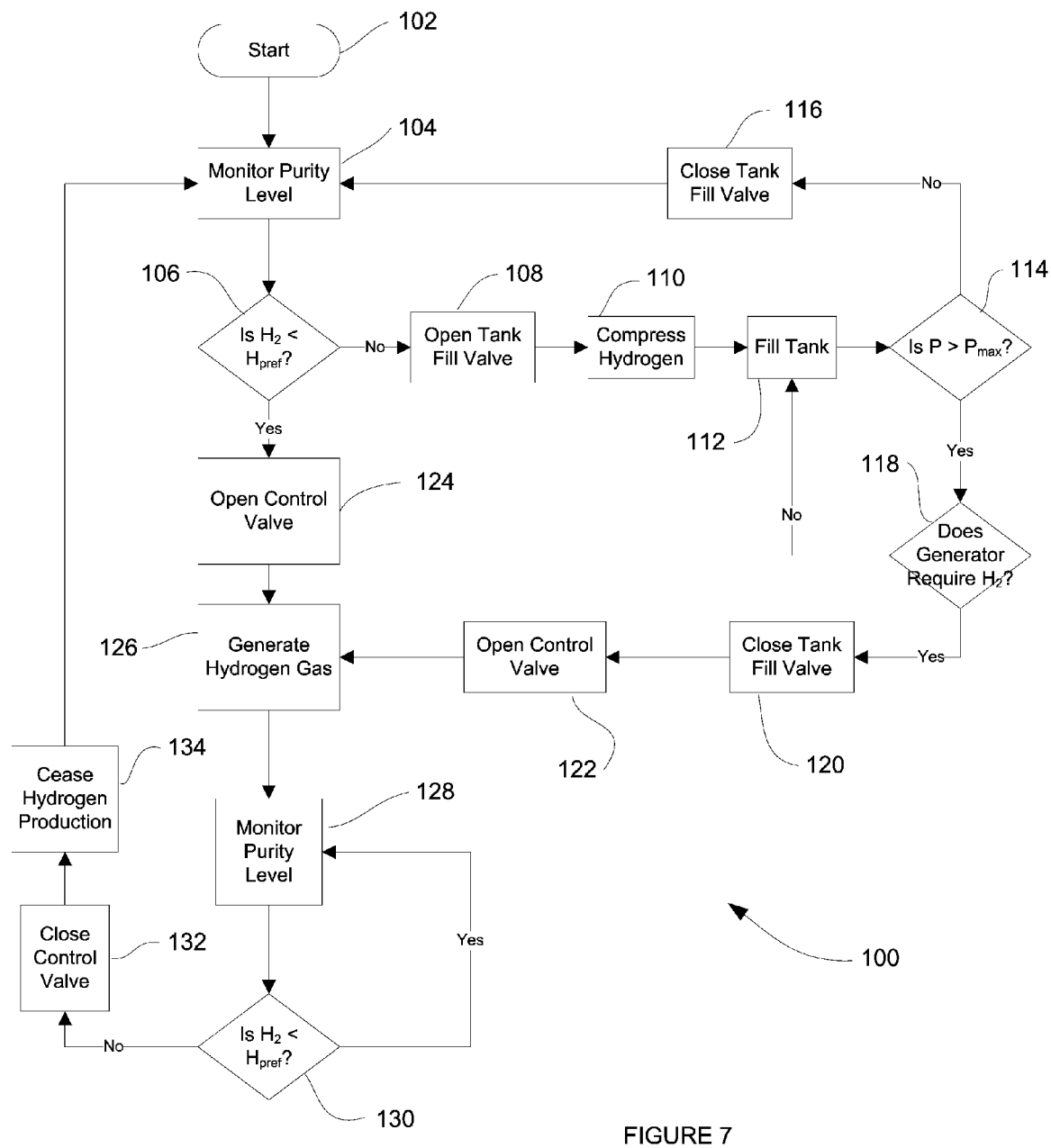
FIG. 7 is a block flow diagram illustrating the method of operating the system of FIG. 4.

FIGS. 5, 6, and 7 are flow diagrams depicting the operation of the generating system 10. These methods may be included and executed in the controller application code in one or more of the individual components of the system 10, or may be embodied in a single central controller (not shown). These methods are embodied in computer instructions written to be executed by a microprocessor typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Languarge), and any combination or derivative of at least one of the foregoing. Additionally, an operator can use an existing software application such as a spreadsheet or database and correlate various components enumerated in the algorithms. Furthermore, the software can be independent of other software or dependent upon other software, such as in the form of integrated software.

Referring to FIGS. 2 and 5 a electrical power generating system control method 60 of FIG. 5 will now be described. Method 60 starts at block 62 and proceeds to block 64. At block 64, the purity monitor 18 samples hydrogen from the generator 12 to determine a value $H_{pure}$ indicative of the level of hydrogen purity in the sampled gas. Method 60 then proceeds to block 66, where the purity level $H_{pure}$ is compared with a desired level $H_{pref}$. The parameter $H_{pref}$ represents the purity level desired by the operator and allows the operator to balance efficiency requirements with hydrogen usage. Alternatively, the operator may choose to monitor the pressure level inside the generator 12 and purposes herein, the monitoring of pressure or purity may be used interchangeably. Typical values for $H_{pref}$ are between 90% and 99% with a desired $H_{pref}$ of 98%. A higher the value of $H_{pref}$ will typically result in greater hydrogen usage. Of the answer to query block 66 is negative, the method 60 returns to block 64 where the hydrogen gas is again sampled and measured. This loop continues generally until method 60 is externally terminated or paused, or until the query of block 66 is answered affirmatively.

If the answer to the query of block 66 is affirmative, either in the first instance or after one or more negative answers, the method 60 proceeds to block 68 where a control signal is passed from purity monitor 18 to the valve 20 causing the valve 20 to open. The opening of the valve 20 allows gas from the generator 12 to be vented to the atmosphere.

The method 60 then proceeds on to block 70 to produce hydrogen gas. Generally, the hydrogen generator 24 will detect the pressure drop at sensor 30 that results from the venting of the generator 12 which occurred in block 68. Typically, upon detection of this drop in pressure below the desired pressure $P_{des}$ the hydrogen generator 24 will initiate production of hydrogen gas which is transferred to the generator 12.

The method 60 then continues on to block 72 where the gas from the generator 12 is sampled and the hydrogen purity measured. Method 60 then proceeds on to query block 74 where the $H_{pure}$ is compared with a desired level $H_{pref}$. If the query answers affirmative, the method 60 loops back to block 72 and continues to monitor the hydrogen purity $H_{pure}$ in the generator 12. This loop continues generally until method 60 is externally terminated or paused, or until the query of block 66 is answered affirmatively.

If the answer to the query in block 74 is negative, this is indicative that the purity level of the hydrogen gas in the generator has reached a level desired by the operator. The method 60 then proceeds on to block 76 where a control signal is passed from the purity monitor 18 to the valve 20. The valve 20 closes and the venting of gas from the generator 12 stops. Method 60 then proceeds on to block 78 where hydrogen production ceases. In the preferred embodiment, when the valve 20 is closed, the pressure will rise in the generator. This pressure rise will be detected in the sensor 30, and when the pressure in the generator reaches the desired pressure $P_{des}$ the hydrogen generator 24 stops production of hydrogen gas. Typically, the desired pressure $P_{des}$ is between 30 psi and 75 psi. Method 60 then continues back to block 64 to start the process again. It will be appreciated that method 60 is performed repetitively during the operation of the system 10.

Referring to FIGS. 3 and 6, an alternate electrical power generation control method 80 of FIG. 6 will now be described. After starting at block 82, method 80 proceeds to block 254 where the hydrogen purity level the $H_{pure}$ of the gas in the generator 12 is sampled measured. Method 80 then proceeds to query block 86 where the parameter $H_{pure}$ is compared with the desired purity level $H_{pref}$. If the query returns a negative response, the method 80 loops back to block 84 and the method continues until terminated or paused by the operator.

If the query block 86 returns an affirmative response, the method 80 continues on to block 88. In block 86, purity monitor 18 sends a control signal to the hydrogen generator 24 which causes the hydrogen generator 24 to initiate hydrogen production at a predetermined flow rate and pressure $P_{des}$. Typically, the desired pressure $P_{des}$ is between 30 psi and 75 psi, with a preferred pressure of 45 psi. In the preferred embodiment, the desired pressure $P_{des}$ is greater than the relief pressure $P_{relief}$ of valve 20.

After hydrogen gas production is initiated, the method 80 continues on to query block 91 where $P_{relief}$ and $P_{gen}$ are introduced into the following query:

Is $P_{gen} > P_{relief}$?

Here, the parameter $P_{gen}$ represents the pressure inside the generator 12 and the parameter $P_{relief}$ represents the pressure setting at which the valve 20 will open allowing the gas from the generator 12 to vent to the atmosphere. If the query in box 86 returns a negative, the method 80 loops back to box 90 and hydrogen continues to be generated and provided to the generator 12. The method 80 continues until terminated or paused by the operator.

If the query in box 91 returns an affirmative response, indicating that the pressure inside the generator has reaches a value greater than the relief setting on the valve 20, the method 80 continues on to box 92 and the valve 20 is opened. The method continues on to monitor the hydrogen purity level $H_{pure}$ in box 93 and compare with the desired purity level in box 94 in a similar manner as has been described herein above.

Once the purity of the hydrogen gas in the generator achieves the desired purity level, the method 80 continues on to block 96 where the purity monitor 18 transmits a control signal to the hydrogen generator 24 causing the hydrogen generator to cease production of hydrogen gas. Once the hydrogen generator stops producing gas, the method 80 continues on to box 98 where the valve 20 will close once the pressure in the generator drops below the predetermined threshold.

Method 80 then continues back to block 84 to start the process again. It will be appreciated that method 80 is performed repetitively during the operation of the system 10.

Figure 4:
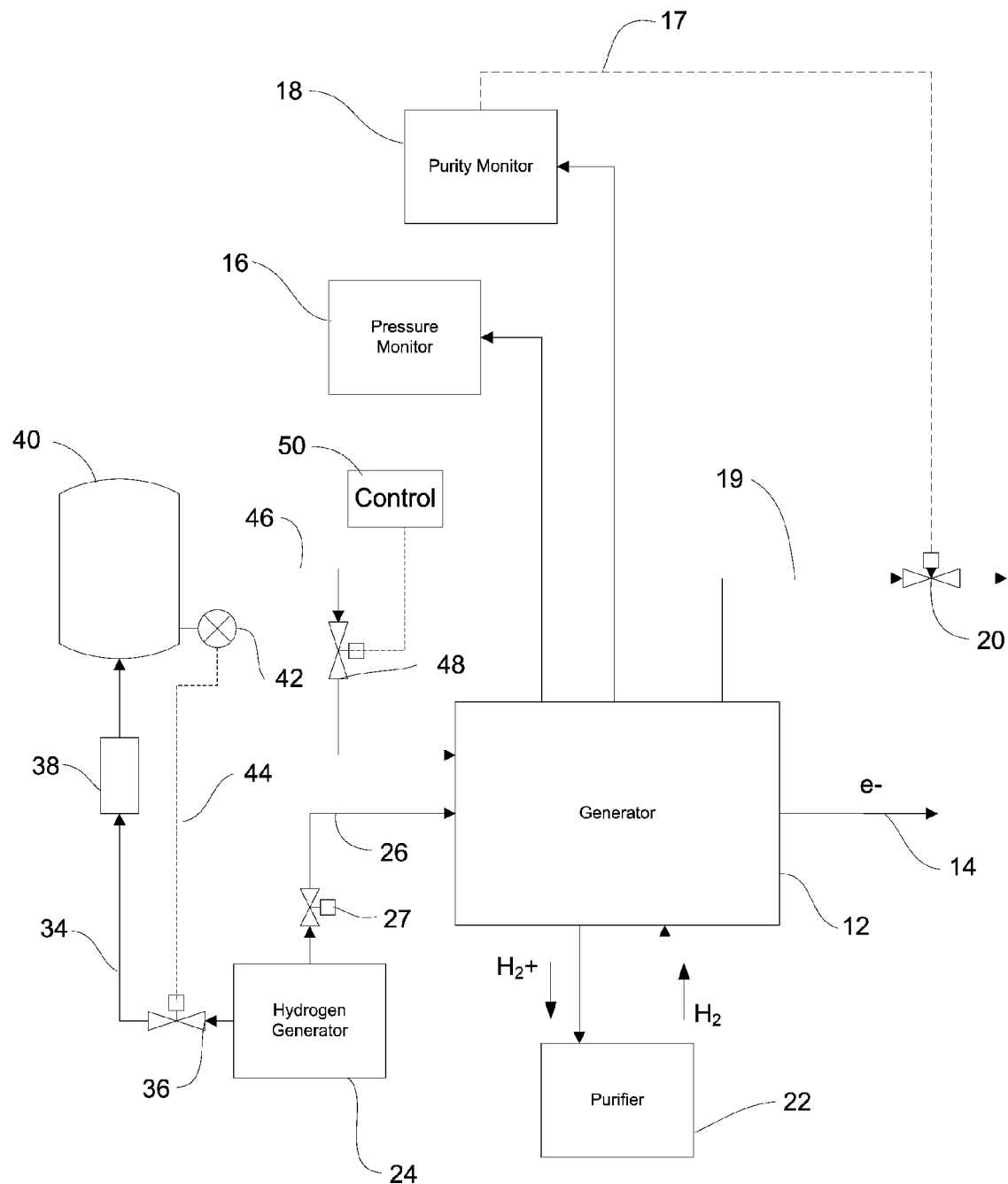
FIG. 4 is a schematic diagram illustrating an alternate embodiment hydrogen purity system with excess hydrogen storage of the present invention.

Referring to FIGS. 4 and 7, an alternate electrical power generation control method 100 of FIG. 7 will now be described. After starting at block 102, method 100 proceeds to block 104 where the hydrogen purity level the $H_{pure}$ of the gas in the generator 12 is sampled measured. Method 100 then proceeds to query block 106 where the parameter $H_{pure}$ is compared with the desired purity level $H_{pref}$. If the query returns a negative response, the method 100 proceeds on to block 108 which opens the valve 36 allowing hydrogen gas to flow from the hydrogen generator 24 towards the tank 40. The method 100 then optionally compresses the hydrogen gas in block 110 and proceeds to fill tank 40 in block 112.

While the tank 40 is filling, the method 100 monitors the pressure $P_{tank}$ in the tank 40. The tank 40 will also have a maximum working pressure rating $P_{max}$. Typically, the tank 40 will have a maximum pressure rating between 2000 psi and 10,000 psi, with a preferred rating of 2,400 psi. Method 100 proceeds to block 114 where $P_{tank}$ and $P_{max}$ are introduced into the following query:

Is $P_{tank} < P_{max}$?

If the query responds affirmatively, the method 100 proceeds query box 18 where the hydrogen purity level is compared to the desired level. If the query returns an affirmative response, which would indicate that the generator required replenishment of pure hydrogen gas. The method 100 then proceeds on to block 120 where the valve 36 is closed and then onto block 122 where the vent valve 20 is opened and gas from the generator 12 is vented to the atmosphere. Method 100 then proceeds through blocks 128-134 to replenish the generator with hydrogen gas to the appropriate purity level in the same manner as was described herein above with respect to method 60 and blocks 72-78.

It should be appreciated that the process steps in blocks 128-134 may also be accomplished using the alternate method described with respect method 80. In addition, in applications where the hydrogen generator 24 is continuously producing gas for the generator 12, it is within the contemplation of this invention that the hydrogen generator 24 provides hydrogen gas to both the tank 40 and the generator 12 simultaneously with preference being given to supplying the generator 12.

While the invention has been described with reference to a preferred embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A system for maintaining hydrogen purity in an electrical generator, the system comprising: a hydrogen generator; a hydrogen cooled electrical generator, said electrical generator fluidly coupled to receive hydrogen gas from said hydrogen generator by a gas conduit; a vent line having a first and second end, said first end being directly fluidly coupled to said electrical generator and said second end being fluidly coupled to the atmosphere; a valve coupled to said vent line between said hydrogen cooled generator and said vent line second end; a hydrogen purity monitor operably coupled to said electrical generator and said valve, said hydrogen purity monitor including means for transmitting a signal to said valve; and, a pressure transducer fluidly coupled to said conduit, said pressure transducer transmitting a signal to said hydrogen generator in response to the gas pressure in said electrical generator falling below a first threshold wherein said hydrogen generator produces hydrogen gas in response to said pressure transducer signal, wherein said valve operates to release hydrogen gas directly from said electrical generator to the atmosphere in response to a signal from said hydrogen purity monitor.

2. The system of claim 1, wherein said hydrogen generator is configured to generate hydrogen gas at a second threshold pressure, said hydrogen generator producing hydrogen gas in response to a reduction in pressure in said electrical generator.

3. The system of claim 2 wherein said hydrogen generator is an electrochemical generator having at least one polymer electrode membrane.

4. The system of claim 3 further comprising a pressure monitor coupled to said hydrogen cooled electrical generator.

5. The system of claim 4 further comprising said hydrogen purity monitor coupled to said electrical generator.

6. The system of claim 2 wherein said hydrogen purity monitor provides a signal to said valve when the purity of hydrogen gas in said electrical generator is less than 99% pure.

7. The system of claim 2 wherein said hydrogen purity monitor provides a signal to said valve when the purity of hydrogen gas in said electrical generator is less than 95% pure.

8. A system for maintaining hydrogen purity in an electrical generator, the system comprising: a hydrogen generator, said hydrogen generator having means for disassociating water into hydrogen and oxygen gas; a hydrogen cooled electrical generator coupled to a turbine, said hydrogen generator being fluidly coupled to directly transfer hydrogen gas to said hydrogen cooled electrical generator by a gas conduit; a vent line having a first and second end, said first end being directly fluidly coupled to said hydrogen cooled electrical generator and said second end being fluidly coupled to the atmosphere; a valve coupled to said vent line between said hydrogen cooled electrical generator and said vent line second end, said valve being configured to release hydrogen gas from said electrical generator through said vent line at a predetermined hydrogen gas pressure level; a hydrogen purity monitor operably coupled to said electrical generator and said hydrogen generator; and, a pressure transducer fluidly coupled to said conduit, said pressure transducer transmitting a signal to said hydrogen generator in response to the gas pressure in said electrical generator falling below a first threshold wherein said hydrogen generator produces hydrogen gas in response to said pressure transducer signal, wherein said valve operates to release hydrogen gas directly from said electrical generator to the atmosphere in response to a signal from said hydrogen purity monitor.

9. The system of claim 8 wherein said hydrogen generator produces hydrogen gas at predetermined rate in response to a signal from said pressure transducer.

10. The system of claim 9 wherein said hydrogen generator is an electrochemical generator having at least one polymer electrode membrane.

11. The system of claim 8 wherein said valve releases hydrogen gas when the gas pressure in said electrical generator exceeds 100 psi.

* * * * *